United States Patent
Johnson et al.

(10) Patent No.: US 8,233,617 B2
(45) Date of Patent: *Jul. 31, 2012

(54) RESILIENT CRYPTOGRAPHIC SCHEME

(75) Inventors: Donald B. Johnson, Manassas, VA (US); Scott Alexander Vanstone, Campbellville, CA (US)

(73) Assignee: Certicom Corp., Mississauga (CA)

( * ) Notice: Subject to any disclaimer, the term of this patent is extended or adjusted under 35 U.S.C. 154(b) by 87 days.

This patent is subject to a terminal disclaimer.

(21) Appl. No.: 12/840,008

(22) Filed: Jul. 20, 2010

(65) Prior Publication Data

US 2010/0284540 A1  Nov. 11, 2010

Related U.S. Application Data

(63) Continuation of application No. 09/907,935, filed on Jul. 19, 2001, now Pat. No. 7,797,539, which is a continuation of application No. PCT/CA00/00040, filed on Jan. 20, 2000.

(30) Foreign Application Priority Data

Jan. 20, 1999 (CA) .................................... 2259738

(51) Int. Cl.
*H04L 9/14* (2006.01)
*G06F 21/24* (2006.01)

(52) U.S. Cl. ........................... 380/28; 380/277; 713/176

(58) Field of Classification Search ........................ None
See application file for complete search history.

(56) References Cited

U.S. PATENT DOCUMENTS

| | | | |
|---|---|---|---|
| 5,297,206 A | 3/1994 | Orton | |
| 5,373,561 A | 12/1994 | Haber et al. | |
| 5,548,648 A | 8/1996 | Yorke-Smith | |
| 5,764,762 A | 6/1998 | Kazmierczak et al. | |
| 5,796,829 A * | 8/1998 | Newby et al. | 705/54 |
| 5,915,024 A | 6/1999 | Kitaori et al. | |
| 5,946,396 A | 8/1999 | Davis | |
| 5,978,484 A | 11/1999 | Apperson et al. | |

(Continued)

FOREIGN PATENT DOCUMENTS

EP  0727746 A2  8/1996

(Continued)

OTHER PUBLICATIONS

Menezes, A. et al.; Handbook of Applied Cryptography; 1997; pp. 283 to 294, 425, 426, 507 and 508; CRC Press, Boca Raton, Florida.

*Primary Examiner* — Christopher Revak
(74) *Attorney, Agent, or Firm* — Novak Druce + Quigg LLP

(57) ABSTRACT

A system and method are provided for enabling a symmetric key to be derived, the method comprising: obtaining a plurality of key parts, wherein the plurality of key parts when combined equal the symmetric key; encrypting a first of the key parts using a first cryptographic algorithm to generate a first encrypted value; encrypting one or more remaining key parts of the plurality of key parts using respective cryptographic algorithms to generate one or more additional encrypted values, wherein each key part encrypted is encrypted using a different cryptographic algorithm; and providing the first encrypted value and the one or more additional encrypted values to an other entity to enable the other entity to derive the symmetric key.

24 Claims, 3 Drawing Sheets

U.S. PATENT DOCUMENTS

| | | | |
|---|---|---|---|
| 5,995,623 | A | 11/1999 | Kawano et al. |
| 6,021,201 | A | 2/2000 | Bakhle et al. |
| 6,490,353 | B1 | 12/2002 | Tan |
| 6,490,680 | B1 * | 12/2002 | Scheidt et al. ............. 713/166 |
| 7,095,852 | B2 * | 8/2006 | Wack et al. ................. 380/44 |
| 7,353,386 | B2 | 4/2008 | Sarfati et al. |
| 7,797,539 | B2 * | 9/2010 | Johnson et al. ............. 713/176 |
| 2007/0014400 | A1 * | 1/2007 | Wack et al. ................. 380/44 |
| 2007/0124602 | A1 | 5/2007 | Wald et al. |
| 2008/0010218 | A1 | 1/2008 | Zank |
| 2009/0141889 | A1 * | 6/2009 | Nakamura .................... 380/44 |
| 2010/0217970 | A1 * | 8/2010 | Carter et al. ................. 713/150 |
| 2011/0116628 | A1 * | 5/2011 | Wack et al. ................. 380/44 |
| 2011/0176675 | A1 * | 7/2011 | Hughes et al. ............... 380/44 |
| 2011/0179287 | A1 * | 7/2011 | Orsini et al. ................ 713/189 |
| 2011/0179444 | A1 * | 7/2011 | Moon et al. .................. 725/31 |
| 2011/0213973 | A1 * | 9/2011 | Handa et al. ................. 713/168 |

FOREIGN PATENT DOCUMENTS

EP              0801478 A2    10/1997

\* cited by examiner

RESILIENT CRYPTOGRAPHIC SCHEME

CROSS-REFERENCE TO RELATED APPLICATIONS

This application is a continuation of U.S. patent application Ser. No. 09/907,935 filed on Jul. 19, 2001, now U.S. Pat. No. 7,797,539, which is a continuation of PCT Application No. PCT/CA00/00040 filed on Jan. 20, 2000, which claims priority from Canadian Patent Application No. 2,259,738 filed on Jan. 20, 1999, all incorporated herein by reference.

FIELD OF THE INVENTION

This invention relates to cryptographic schemes, and particularly, to a method for implementing a cryptographic scheme that is resistant to catastrophic failure.

BACKGROUND OF THE INVENTION

Cryptographic schemes allow correspondents to send messages in secret or hidden form, so that only those people authorized to receive the message will be able to read it. Cryptographic schemes are generally based on one of two systems, namely, a private key system or a public key system. In a private key system, the method for data encryption requires the parties who communicate to share a common key. Private key systems have the disadvantage that the users of the scheme have to somehow exchange a common key in a secure fashion before any data is encrypted. This key should also be changed relatively often for other cryptographic reasons.

Whereas private key cryptography utilizes a single key for both encryption and decryption, public key cryptography utilizes several different keys for encryption and decryption. The encryption keys can thus be made public with the decryption keys maintained secret.

Public key systems have been deployed in specific systems. For example, the RSA scheme is a deployment of the general public key scheme. Similarly, discrete log systems and elliptic curve systems are other deployments of the general public key system. Public key systems may also be used to sign messages so that a recipient may verify the origin of the message using a public key of the sender.

Obviously, in a cryptographic system there is the threat of an attacker obtaining or deducing the key, the private key in the case of public key systems, and thereby compromising communication between a pair of users. The lucky recovery by an attacker of one or two keys is not in itself a serious problem, as a particular key can be revoked and disallowed for further use. However, a serious threat to the future resiliency of a particular cryptographic scheme is the ability of an attacker to devise a systematic method whereby a large number, or even all keys, for that system can be recovered. The resistance to such systematic attacks will depend on the underlying system used, but one factor is the key size.

For example, in the RSA scheme, keys of 512 bits or less are extremely vulnerable to a variety of attacks.

Corporate-wide deployment of a specific scheme is normally based on an assumption that the scheme will be secure at least for some time beyond the near future. However, just as cryptographic systems are advancing in their security, so are attackers advancing in devising new attacks against these systems. For example, in the future there may be an advance on the special purpose attack method which attacks a subset of keys for a particular scheme or there may be an advance in a general purpose attack method which attacks essentially all keys. The response to a special purpose attack on a keyed algorithm is to generally exclude weak cases, i.e., keys with a certain weak property. Similarly, a general-purpose attack can be addressed by increasing the primary security parameters to where attacks are again infeasible.

Therefore, there is a need for a cryptographic scheme that is more resilient than the schemes presently in use.

SUMMARY OF THE INVENTION

Accordingly, it is an object of this invention to provide a more resilient cryptographic scheme that is more resistant to specific or general purpose attacks than current schemes.

In accordance with this invention there is provided a method for communicating information between at least first and a second correspondent, the method comprising the steps of: selecting a plurality of cryptographic algorithms known to each of the correspondents; the first correspondents applying the algorithms in a predetermined manner to a message to produce processed information; transmitting this processed information to the other correspondent; and the second correspondent applying complimentary operations of said cryptographic schemes in accordance with the predetermined manner to derive information related to the message from the processed information.

BRIEF DESCRIPTION OF THE DRAWINGS

These and other features of the preferred embodiments of the invention will become more apparent in the following detailed description in which reference is made to the appended drawings wherein.

DESCRIPTION OF THE PREFERRED EMBODIMENTS

Figure 1:
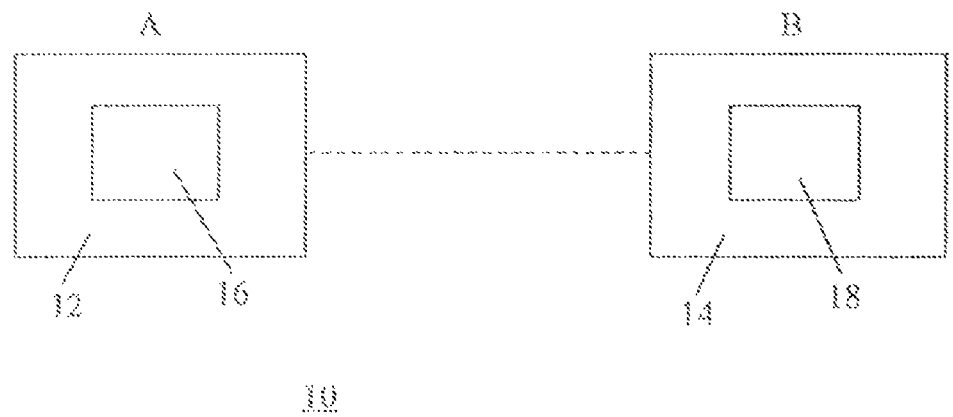
FIG. 1 is schematic diagram of a communication system.

Referring to FIG. 1, a communication system having at least a pair of correspondents is shown generally by numeral 10. It is assumed that the correspondents 12 and 14 incorporate cryptographic units 16 and 18 respectively. For convenience, the first correspondent will be referred to as a sender and the second correspondent will be referred to as a receiver. Generally, a plain text message is processed by the encryption unit of the sender and transmitted as cyphertext along a communication channel to the receiver where the encryption message is decrypted by the cryptographic unit 18 to recover the original message.

Figure 2:
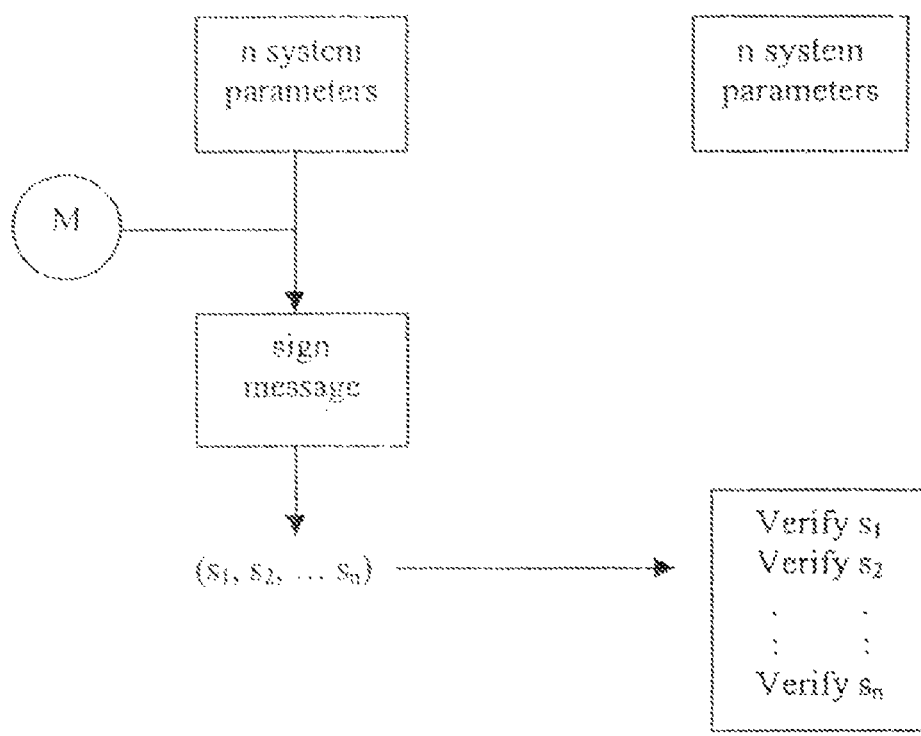
FIG. 2 is a flow diagram showing a signature scheme according to an embodiment of the present invention.

Referring to FIG. 2, a signature scheme according to an embodiment of the invention is shown generally by numeral 30. In this embodiment, the correspondents select several signature schemes such as RSA, DSA and ECDSA from a plurality of signature schemes. Using these three signature schemes, the sender processes the information to be signed to produce three sets of processed information in the form of three independent signatures ($S_1$, $S_2$, $S_3$). These combine to form a multiple signature. The individual signatures are then transmitted to the recipient who then verifies the signatures using the corresponding verification part of the algorithm.

Thus, it may be seen that a break in any one or two algorithms will not affect the validity of the remaining signatures. Therefore, if all three signatures cannot be verified, the recipient is aware that at, least one of the sets of processed information may have been interfered with by a third party. In order for the third party to effectively interfere with a signature using such a scheme, the third party has to break all of the encryption algorithms used. Although the third party may be able to uncover information related to the original message, it is of little use without breaking the remaining algorithms.

Although the present embodiment is described as selecting three signature schemes, any plurality of schemes may be used as required by a particular implementation. Further, effective signature schemes other than RSA, DSA, and ECDSA may also be used.

Figure 3:
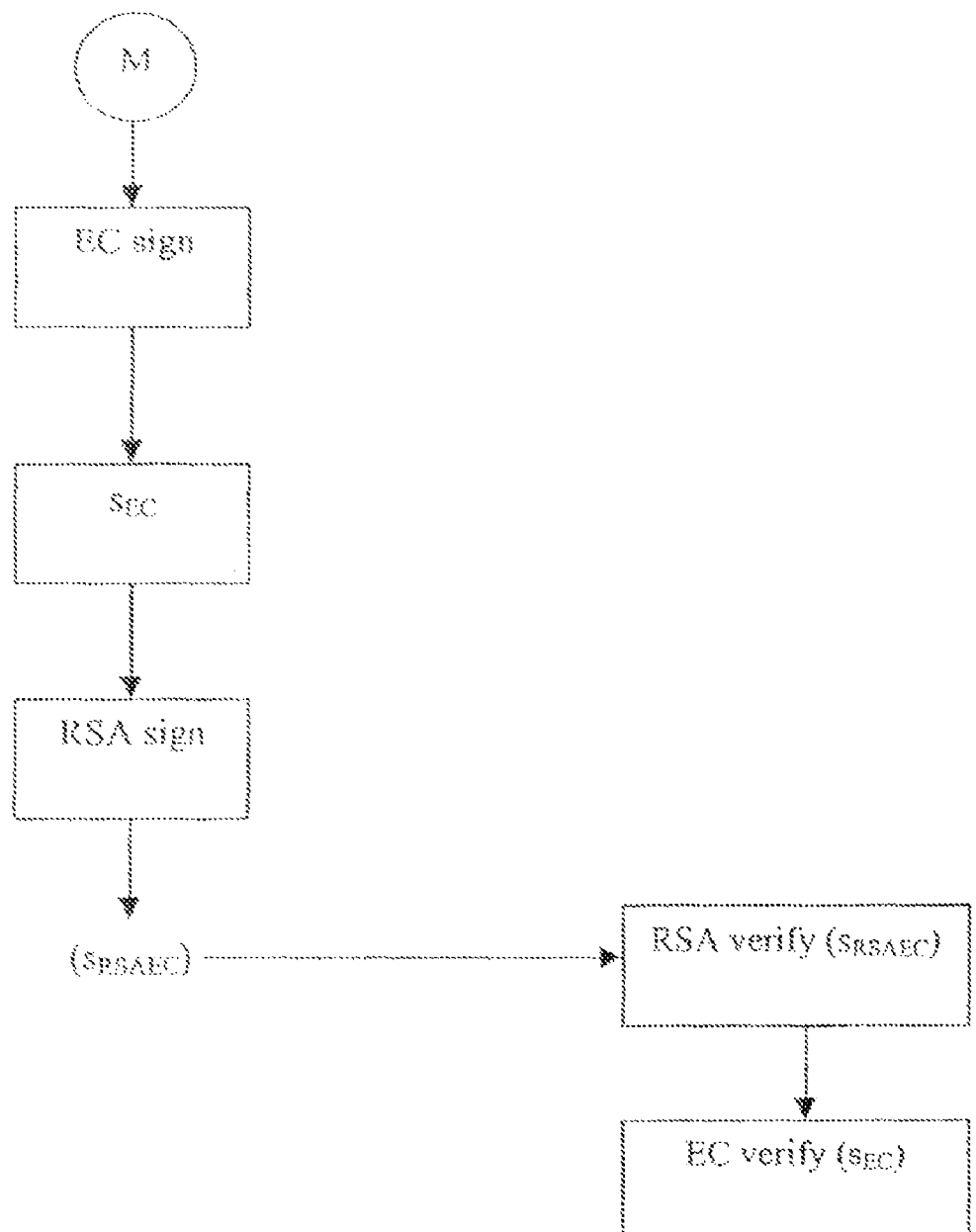
FIG. 3 is a flow diagram showing a further signature scheme according to an embodiment of the invention.

An alternate embodiment is illustrated in FIG. 3 by the numeral 40. The sender uses ECDSA for generating a set of processed information in the form of air EC signature. The sender subsequently inputs the EC signature to an RSA signature generation function (with message recovery) to generate a further set of processed information in the form of an RSA signed EC signature. The RSA signed EC signature is then transmitted to the recipient.

The recipient initially recovers the EC signature from the RSA sign EC signature. The recipient then recovers the original message from the EC signature and verifies the identity of the origin of the message. The EC signature thus provides redundancy for preventing manipulation attacks on the RSA signature. As in the previous embodiment, in order for the third party to effectively interfere with a signature using such a scheme, the third party has to break all of the encryption algorithms used. However, using the present embodiment will prevent the third party from uncovering information related to the original message unless all of the encryption algorithms are broken.

Furthermore, using alternate signature schemes or the same schemes in a different order is possible.

Figure 4:
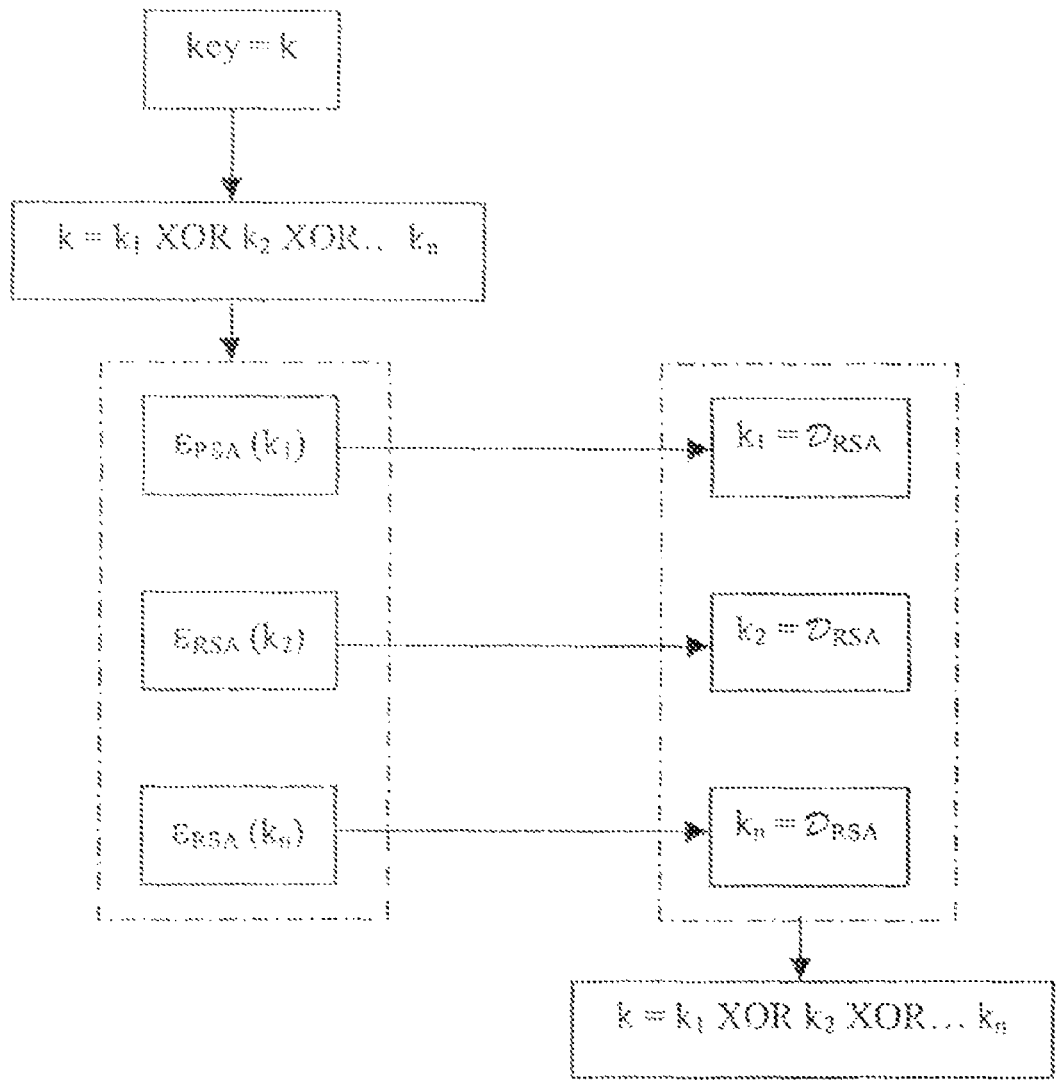
FIG. 4 is a flow diagram of key agreement scheme according to an embodiment of the invention.

Yet an alternate embodiment is illustrated in FIG. 4, referred to generally by the numeral 50. In the present embodiment, the correspondents wish to communicate with a symmetric key. In general, public key schemes are used to assign symmetric keys transmitted between correspondents. The symmetric keys are then used by the correspondents to encrypt and decrypt messages transmitted between the correspondents. The symmetric key is then divided in to a plurality of parts. In this example, the key is divided into three parts and each of the parts is encrypted a respective cryptographic algorithm. The first part is encrypted RSA, the second part with a discrete log (DL) encryption, and the third with EC encryption. The three parts are then transmitted to the recipient who recovers all three parts by applying the corresponding decryption operation on the respective part. Each of the parts is then XOR'd together to derive the symmetric key. A key confirmation algorithm may then be used to ensure that the recovered symmetric key is correct. A break in one or two of the algorithms will not allow an adversary to recover the value of the symmetric key.

For key agreement, the sender composes three shared secrets from RSA, DL and EC key agreement schemes (respectively) all three of which are then input to a symmetric key derivation function. Alternatively, the sender may derive three symmetric key parts independently from an RSA shared secret, a DL shared secret, and an EC shared secret.

In a message authentication code (MAC), the correspondents can use different MAC algorithms such as DES-CBC-MAC and HMAC and then follow one of those signature models described above. For data encryption, the correspondents supercipher with different symmetric or asymmetric algorithms.

The present invention may also be applied to one way hash functions by using multiple hash outputs, where the multiple hash functions are preferably based on different functions. The present embodiment is similar to the first embodiment. Different hashing functions are applied to the same message. The results of the hashing function are sent to the recipient along with an encrypted message. If a third party breaks one or two of the hashing functions, it will not affect the validity of the remaining hashing functions. The recipient verifies the authenticity of all of the hashing functions. If the third party has interfered with the transmission without breaking all of the hashing functions, then all of the hashing function will not be verified. Therefore, the recipient will be aware the third party has attempted to interfere with the transmission.

Such methods as described above typically find use in e-commerce transactions involving large monetary transactions where the authenticity of the signatory is critical.

A further embodiment of the invention provides for a computer system programmed in accordance with the methods described herein.

Furthermore, an embodiment of the invention provides for a data carrier such as a computer disk, CD-ROM, and the like, carrying computer code for implementing the methods described herein.

A further embodiment of the invention provides for a virtual environment, such as an applet, for implementing the methods described herein.

Although the invention has been described with reference to certain specific embodiments, various modifications thereof will be apparent to those skilled in the art without departing from the spirit and scope of the invention as outlined in the claims appended hereto.

The invention claimed is:

1. A method of enabling a symmetric key to be derived, the method comprising:
   a processor obtaining a plurality of key parts, wherein the plurality of key parts when combined equal the symmetric key;
   the processor encrypting a first of the key parts using a first cryptographic algorithm to generate a first encrypted value;
   the processor encrypting one or more remaining key parts of the plurality of key parts using respective cryptographic algorithms to generate one or more additional encrypted values, wherein each key part encrypted is encrypted using a different cryptographic algorithm; and
   the processor providing the first encrypted value and the one or more additional encrypted values to an other entity to enable the other entity to derive the symmetric key.

2. The method according to claim 1, wherein the obtaining comprises obtaining the symmetric key and dividing the symmetric key into the plurality of key parts.

3. The method according to claim 1, wherein applying a symmetric key derivation function to the plurality of key parts derives the symmetric key.

4. The method according to claim 1, wherein the different cryptographic algorithms are chosen from the group comprising: an elliptic curve (EC) algorithm, a Rivest-Shamir-Adleman (RSA) algorithm, and a discrete logarithm (DL) algorithm.

5. The method according to claim 4, wherein the different cryptographic algorithms correspond to different ones in the group.

6. The method according to claim 1, wherein XORing the plurality of key parts derives the symmetric key.

7. A non-transitory computer readable medium comprising computer executable instructions that when executed by a computing device, operate the computing device to:
- obtain a plurality of key parts, wherein the plurality of key parts when combined equal a symmetric key;
- encrypt a first of the key parts using a first cryptographic algorithm to generate a first encrypted value;
- encrypt one or more remaining key parts of the plurality of key parts using respective cryptographic algorithms to generate one or more additional encrypted values, wherein each key part encrypted is encrypted using a different cryptographic algorithm; and
- provide the first encrypted value and the one or more additional encrypted values to another entity to enable the other entity to derive the symmetric key.

8. A cryptographic unit comprising:
a processor operable to:
- obtain a plurality of key parts, wherein the plurality of key parts when combined equal a symmetric key;
- encrypt a first of the key parts using a first cryptographic algorithm to generate a first encrypted value;
- encrypt one or more remaining key parts of the plurality of key parts using respective cryptographic algorithms to generate one or more additional encrypted values, wherein each key part encrypted is encrypted using a different cryptographic algorithm; and
- provide the first encrypted value and the one or more additional encrypted values to another entity to enable the other entity to derive the symmetric key.

9. The cryptographic unit according to claim 8, wherein the plurality of key parts are obtained by obtaining the symmetric key and dividing the symmetric key into the plurality of key parts.

10. The cryptographic unit according to claim 8, wherein applying a symmetric key derivation function to the plurality of key parts derives the symmetric key.

11. The cryptographic unit according to claim 8, wherein the different cryptographic algorithms are chosen from the group comprising: an elliptic curve (EC) algorithm, a Rivest-Shamir-Adleman (RSA) algorithm, and a discrete logarithm (DL) algorithm.

12. The cryptographic unit according to claim 11, wherein the different cryptographic algorithms correspond to different ones in the group.

13. The cryptographic unit according to claim 8, wherein XORing the plurality of key parts derives the symmetric key.

14. A method of deriving a symmetric key, the method comprising:
- a processor obtaining a first encrypted value and one or more additional encrypted values;
- the processor decrypting the first encrypted value and the one or more additional encrypted values to obtain a plurality of key parts, wherein each key part decrypted is decrypted from a respective encrypted value using a different cryptographic algorithm; and
- the processor combining the plurality of key parts in deriving the symmetric key.

15. The method according to claim 14, wherein the plurality of key parts correspond to respective shared secrets, and wherein applying a symmetric key derivation function to the plurality of key parts derives the symmetric key.

16. The method according to claim 14, wherein the different cryptographic algorithms are chosen from the group comprising: an elliptic curve (EC) algorithm, a Rivest-Shamir-Adleman (RSA) algorithm, and a discrete logarithm (DL) algorithm.

17. The method according to claim 16, wherein the different cryptographic algorithms correspond to different ones in the group.

18. The method according to claim 14, wherein XORing the plurality of key parts derives the symmetric key.

19. A non-transitory computer readable medium comprising computer executable instructions that when executed by a computing device, operate the computing device to:
- obtain a first encrypted value and one or more additional encrypted values;
- decrypt the first encrypted value and the one or more additional encrypted values to obtain a plurality of key parts, wherein each key part decrypted is decrypted from a respective encrypted value using a different cryptographic algorithm; and
- combine the plurality of key parts in deriving the symmetric key.

20. A cryptographic unit comprising:
a processor operable to:
- obtain a first encrypted value and one or more additional encrypted values;
- decrypt the first encrypted value and the one or more additional encrypted values to obtain a plurality of key parts, wherein each key part decrypted is decrypted from a respective encrypted value using a different cryptographic algorithm; and
- combine the plurality of key parts in deriving the symmetric key.

21. The cryptographic unit according to claim 20, wherein the plurality of key parts correspond to respective shared secrets, and wherein applying a symmetric key derivation function to the plurality of key parts derives the symmetric key.

22. The cryptographic unit according to claim 20, wherein the different cryptographic algorithms are chosen from the group comprising: an elliptic curve (EC) algorithm, a Rivest-Shamir-Adleman (RSA) algorithm, and a discrete logarithm (DL) algorithm.

23. The cryptographic unit according to claim 22, wherein the different cryptographic algorithms correspond to different ones in the group.

24. The cryptographic unit according to claim 20, wherein XORing the plurality of key parts derives the symmetric key.

* * * * *